No Printed Specification Available
7962X
J.H. Chappell.
Tailoring.
Nº
Patented Jan. 18. 1834.
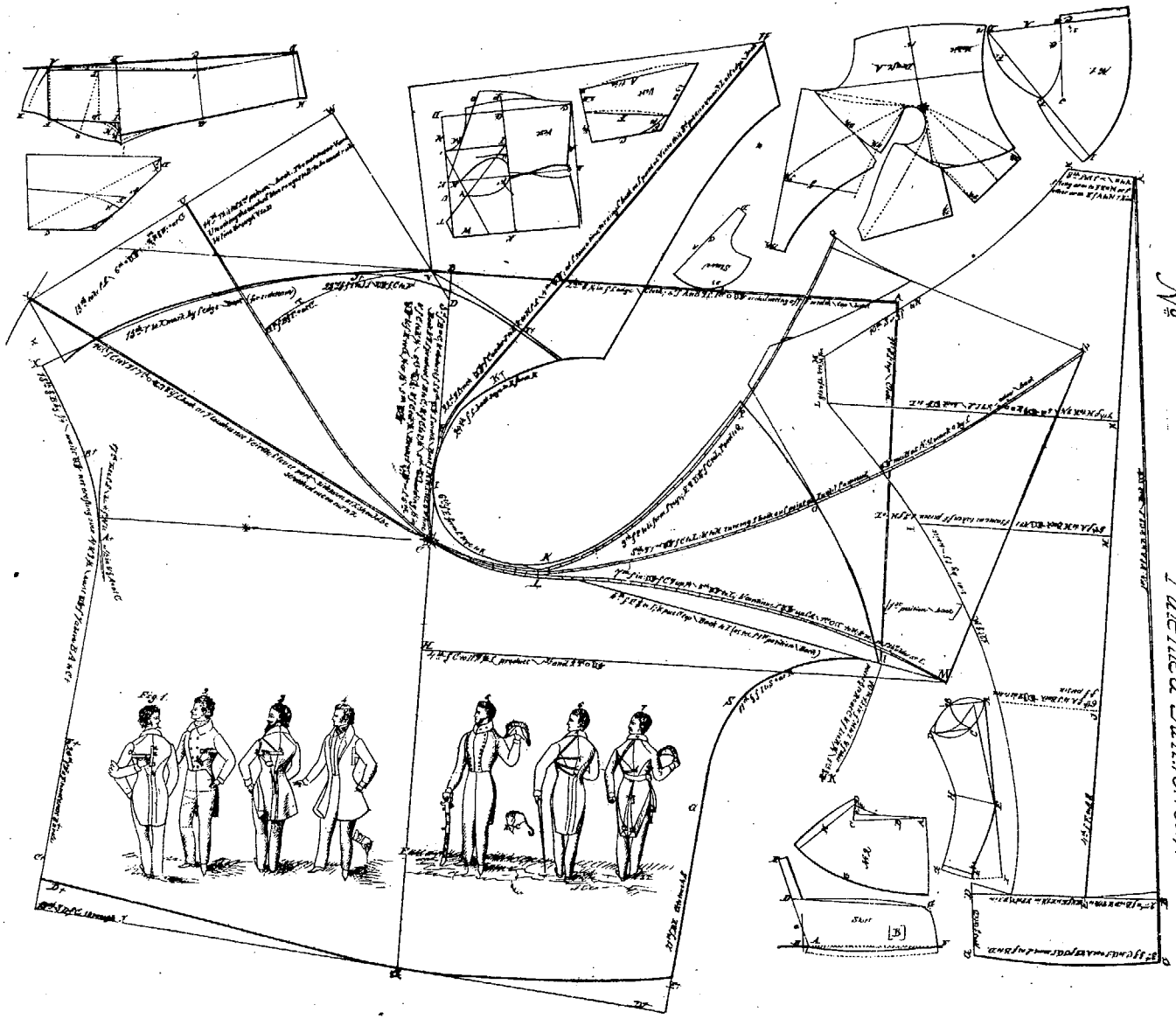

James H Chappell Chelicothe Ohio

Letters Patent.

The Schedule referred to in these Letters Patent and making part of the same containing a description in the words of the said James H Chappell himself of his improvement in the art of drafting and cutting garments.

To all to whom these presents shall come. Be it known that I James H Chappell of Chelicothe in the County of Ross and State of Ohio have invented a new and useful improvement in the art of drafting and cutting garments and that the following is a full and exact description of the art. as invented or improved by me — The name of this improvement is the spherical system of drafting and cutting garments. and Elastic square a measure Book accompanying the system. The drafts herewith sent are: a representation of a Coat. Great Coat, & Vest. pantaloons. gaiters Cloak. Frock. shirt collars and lappells. and a lady's habit. all of which are formed by right lines and spheres as the printed explanations fully show.

Wherein the aforesaid system differs from other systems of said art is. that the latter is based upon the divisions of the breast waist or height of a person into graduated numbers to suit the convenience of the practitioner. one adds to the division of the breast measure. measures taken from the top of the back round the front of ~~the~~ shoulder to the same point started from. from the starting point of the former measure to the middle of the back and to the waist. a standard accompanying the work is used to get the height and bottom of arm hole. while the aforesaid spherical system has its base and principles from whole measures, taken from a point of the Body at a right angle in front of and bottom of arm hole & scye. for further particulars see explanations for measuring and drafting coats. The Elastic square is of elastic metal or wood plain. each arm from twelve to eighteen inches long. one half or two inches wide the thickness according to the elasticity of the substance made of. for the application of see the ~~explanation~~ direction for measuring, in printed explanation. — The measure Book is for the purpose of Recording measures. directions on each end of the cover the name & No on one end in the other record the measure and number it the same as that

442

7962X of the name each leaf to contain the same as the head and the Mo. should commence at a unit proceeding until the Book is filled Test. Witnesses Thos. B. Stone — James H. Chaffell William Dunlap Drawing 442 wd